__US012354095B2__

(12) United States Patent
Tandra et al.

(10) Patent No.: US 12,354,095 B2
(45) Date of Patent: Jul. 8, 2025

(54) DISTRIBUTED DATABASE WITH INTER-RELATED RECORDS RELATING TO A VEHICLE

(71) Applicant: Capital One Services, LLC, McLean, VA (US)

(72) Inventors: Praveen Tandra, Allen, TX (US); Gopi Kancharla, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 126 days.

(21) Appl. No.: 18/052,363

(22) Filed: Nov. 3, 2022

(65) Prior Publication Data

US 2024/0152918 A1 May 9, 2024

(51) Int. Cl.
| | |
|---|---|
| *G06Q 20/40* | (2012.01) |
| *G06F 16/23* | (2019.01) |
| *G06F 16/27* | (2019.01) |
| *G06Q 20/22* | (2012.01) |

(52) U.S. Cl.
CPC ....... *G06Q 20/401* (2013.01); *G06F 16/2379* (2019.01); *G06F 16/27* (2019.01); *G06Q 20/223* (2013.01)

(58) Field of Classification Search
CPC .................................................. G06Q 40/00
USPC ......................................................... 705/35
See application file for complete search history.

(56) References Cited

U.S. PATENT DOCUMENTS

| | | | | |
|---|---|---|---|---|
| 5,297,031 | A * | 3/1994 | Gutterman | G06Q 40/04 705/37 |
| 5,915,245 | A * | 6/1999 | Patterson, Jr. | H04L 61/50 340/4.5 |
| 6,161,099 | A * | 12/2000 | Harrington | G06Q 40/06 705/36 R |
| 6,321,212 | B1 * | 11/2001 | Lange | G06Q 40/06 705/36 R |
| 6,345,090 | B1 * | 2/2002 | Walker | G06Q 40/04 379/114.03 |
| 6,366,682 | B1 * | 4/2002 | Hoffman | G06Q 20/4097 382/115 |
| 6,421,653 | B1 * | 7/2002 | May | G06Q 40/04 705/36 R |
| 6,493,683 | B1 * | 12/2002 | David | G06Q 40/04 705/37 |

(Continued)

OTHER PUBLICATIONS

"GM files a new patent on using the blockchain," What Next; Website: https://whatnextglobal.com/insights/gm-files-a-new-patent-on-using-the-blockchain; Obtained Nov. 3, 2022, 8 Pages.

(Continued)

*Primary Examiner* — Kirsten S Apple
(74) *Attorney, Agent, or Firm* — Harrity & Harrity, LLP

(57) ABSTRACT

In some implementations, a device may retrieve information relating to a vehicle in a vehicle exchange, where the information relating to the vehicle is in a distributed database that is particular to the vehicle, and where the distributed database includes a plurality of inter-related records relating to the vehicle. The device may receive, from a user device, an indication of an exchange amount for the vehicle. The device may cause, based on the indication, a smart contract to be added to the distributed database, the smart contract indicating the exchange amount.

20 Claims, 12 Drawing Sheets

(56) References Cited

U.S. PATENT DOCUMENTS

| | | | | |
|---|---|---|---|---|
| 6,603,487 | B1* | 8/2003 | Bennett | G06Q 10/10 |
| | | | | 715/751 |
| 6,629,081 | B1* | 9/2003 | Cornelius | G06Q 20/04 |
| | | | | 705/30 |
| 6,659,861 | B1* | 12/2003 | Faris | H04L 69/28 |
| | | | | 463/29 |
| 6,732,161 | B1* | 5/2004 | Hess | G06Q 30/06 |
| | | | | 709/219 |
| 6,768,981 | B2* | 7/2004 | Patterson, Jr. | H04L 61/50 |
| | | | | 705/37 |
| 6,892,186 | B1* | 5/2005 | Preist | G06Q 40/04 |
| | | | | 705/37 |
| 6,952,682 | B1* | 10/2005 | Wellman | G06Q 40/00 |
| | | | | 705/37 |
| 7,007,076 | B1* | 2/2006 | Hess | G06F 12/0223 |
| | | | | 705/37 |
| 7,669,759 | B1* | 3/2010 | Zettner | H04M 7/0024 |
| | | | | 235/492 |
| 8,001,035 | B2* | 8/2011 | Kwan | G06Q 40/00 |
| | | | | 705/37 |
| 8,682,802 | B1* | 3/2014 | Kannanari | G06Q 20/3274 |
| | | | | 705/64 |
| 8,762,272 | B1* | 6/2014 | Cozens | H04L 51/48 |
| | | | | 705/40 |
| 10,438,202 | B2* | 10/2019 | Neighman | G06Q 20/4012 |
| 10,755,327 | B2 | 8/2020 | Nagla et al. | |
| 2001/0056372 | A1* | 12/2001 | Rogan | G06Q 30/0225 |
| | | | | 705/14.12 |
| 2002/0049670 | A1* | 4/2002 | Moritsu | G06Q 20/14 |
| | | | | 705/40 |
| 2002/0061094 | A1* | 5/2002 | Walker | G06Q 20/425 |
| | | | | 379/93.12 |
| 2003/0135459 | A1* | 7/2003 | Abelman | G06Q 20/04 |
| | | | | 705/40 |
| 2003/0200153 | A1* | 10/2003 | Smith, II | H04N 1/34 |
| | | | | 705/26.1 |
| 2006/0044153 | A1* | 3/2006 | Dawidowsky | G06K 19/0723 |
| | | | | 710/10 |
| 2006/0080112 | A1* | 4/2006 | Fontijn | H04L 67/104 |
| | | | | 709/225 |
| 2006/0195428 | A1* | 8/2006 | Peckover | G06F 16/951 |
| 2007/0061881 | A1* | 3/2007 | Eyre | G06Q 30/02 |
| | | | | 726/21 |
| 2007/0179885 | A1* | 8/2007 | Bird | G06Q 20/10 |
| | | | | 705/39 |
| 2008/0249951 | A1* | 10/2008 | Gilder | G06Q 20/0425 |
| | | | | 705/76 |
| 2009/0063312 | A1* | 3/2009 | Hurst | G06Q 20/40 |
| | | | | 705/41 |
| 2010/0078471 | A1* | 4/2010 | Lin | G06Q 40/02 |
| | | | | 235/379 |
| 2011/0131104 | A1* | 6/2011 | Rose | G06Q 20/20 |
| | | | | 235/487 |
| 2011/0184843 | A1* | 7/2011 | Orttung | G06Q 20/02 |
| | | | | 705/40 |
| 2011/0225064 | A1* | 9/2011 | Fou | G06Q 20/385 |
| | | | | 705/26.41 |
| 2012/0191605 | A1* | 7/2012 | Foster | G06Q 20/102 |
| | | | | 705/40 |
| 2012/0240195 | A1* | 9/2012 | Weiss | H04L 63/0853 |
| | | | | 726/4 |
| 2012/0267432 | A1* | 10/2012 | Kuttuva | G06Q 20/3276 |
| | | | | 235/379 |
| 2014/0279868 | A1* | 9/2014 | Astorg | G06F 16/22 |
| | | | | 707/741 |
| 2015/0170233 | A1* | 6/2015 | Lisitsa | H01L 23/427 |
| | | | | 705/26.1 |
| 2015/0242915 | A1* | 8/2015 | Codiroli | G06Q 30/0613 |
| | | | | 705/26.41 |
| 2018/0165630 | A1* | 6/2018 | Gifford | G06Q 10/063112 |
| 2018/0357711 | A1* | 12/2018 | Konawel | G06Q 30/0629 |
| 2021/0374816 | A1* | 12/2021 | Yamasaki | G06Q 30/02 |
| 2023/0281688 | A1* | 9/2023 | Errama | G06T 19/003 |
| | | | | 705/69 |

OTHER PUBLICATIONS

Gregory McCubbin, "How to Build a Blockchain App with Ethereum, Web3.js & Solidity Smart Contracts," Dapp University Website: https://www.dappuniversity.com/articles/how-to-build-a-blockchain-app, Oct. 19, 2022, 41 Pages.

* cited by examiner

DISTRIBUTED DATABASE WITH INTER-RELATED RECORDS RELATING TO A VEHICLE

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

Some implementations described herein relate to a method of inter-relating records in a distributed database. The method may include receiving, by a device, from a user device, a first indication to retrieve information relating to a vehicle in a vehicle exchange. The method may include retrieving, by the device, based on the first indication, the information relating to the vehicle in the vehicle exchange, where the information relating to the vehicle is in a first record of a distributed database that is particular to the vehicle, and where the distributed database includes a plurality of inter-related records relating to the vehicle. The method may include receiving, by the device, from the user device, a second indication of one or more exchange settings for the vehicle. The method may include causing, by the device, based on the second indication, a first smart contract, that is directly or indirectly inter-related with the first record, to be added to the distributed database, the first smart contract indicating the one or more exchange settings, where execution of the first smart contract is to automatically cause a second smart contract, that is directly or indirectly inter-related with the first smart contract, to be added to the distributed database, the second smart contract indicating an exchange amount for the vehicle based on the one or more exchange settings. The method may include causing, by the device, based on an exchange for the vehicle in connection with the exchange amount, a third smart contract, that is directly or indirectly inter-related with the second smart contract, to be added to the distributed database, the third smart contract indicating a service event for the exchange for the vehicle. The method may include causing, by the device and based on the service event, a transfer to an account of a user associated with the vehicle.

Some implementations described herein relate to a system for inter-relating records in a distributed database. The system may include one or more memories and one or more processors communicatively coupled to the one or more memories. The one or more processors may be configured to cause, based on a first indication to enter a vehicle, of a first user, in a vehicle exchange, generation of a first record of a distributed database, the first record indicating information associated with the vehicle, where the distributed database is particular to the vehicle, and where the distributed database is to include a plurality of inter-related records relating to the vehicle. The one or more processors may be configured to cause, based on a second indication indicating one or more exchange settings of a second user, a first smart contract, that is directly or indirectly inter-related with the first record, to be added to the distributed database, the first smart contract indicating the one or more exchange settings, where execution of the first smart contract is to cause a second smart contract, that is directly or indirectly inter-related with the first smart contract, to be automatically added to the distributed database, the second smart contract indicating an exchange amount for the vehicle based on the one or more exchange settings. The one or more processors may be configured to cause, based on a third indication of acceptance of the exchange amount for the vehicle, a third smart contract, that is directly or indirectly inter-related with the second smart contract, to be added to the distributed database, the third smart contract indicating an exchange of the vehicle between the first user and the second user.

Some implementations described herein relate to a non-transitory computer-readable medium that stores a set of instructions for inter-relating records in a distributed database for a device. The set of instructions, when executed by one or more processors of the device, may cause the device to retrieve information relating to a vehicle in a vehicle exchange, where the information relating to the vehicle is in a distributed database that is particular to the vehicle, and where the distributed database includes a plurality of inter-related records relating to the vehicle. The set of instructions, when executed by one or more processors of the device, may cause the device to receive, from a user device, an indication of an exchange amount for the vehicle. The set of instructions, when executed by one or more processors of the device, may cause the device to cause, based on the indication, a smart contract to be added to the distributed database, the smart contract indicating the exchange amount.

DETAILED DESCRIPTION

Figure 1A:
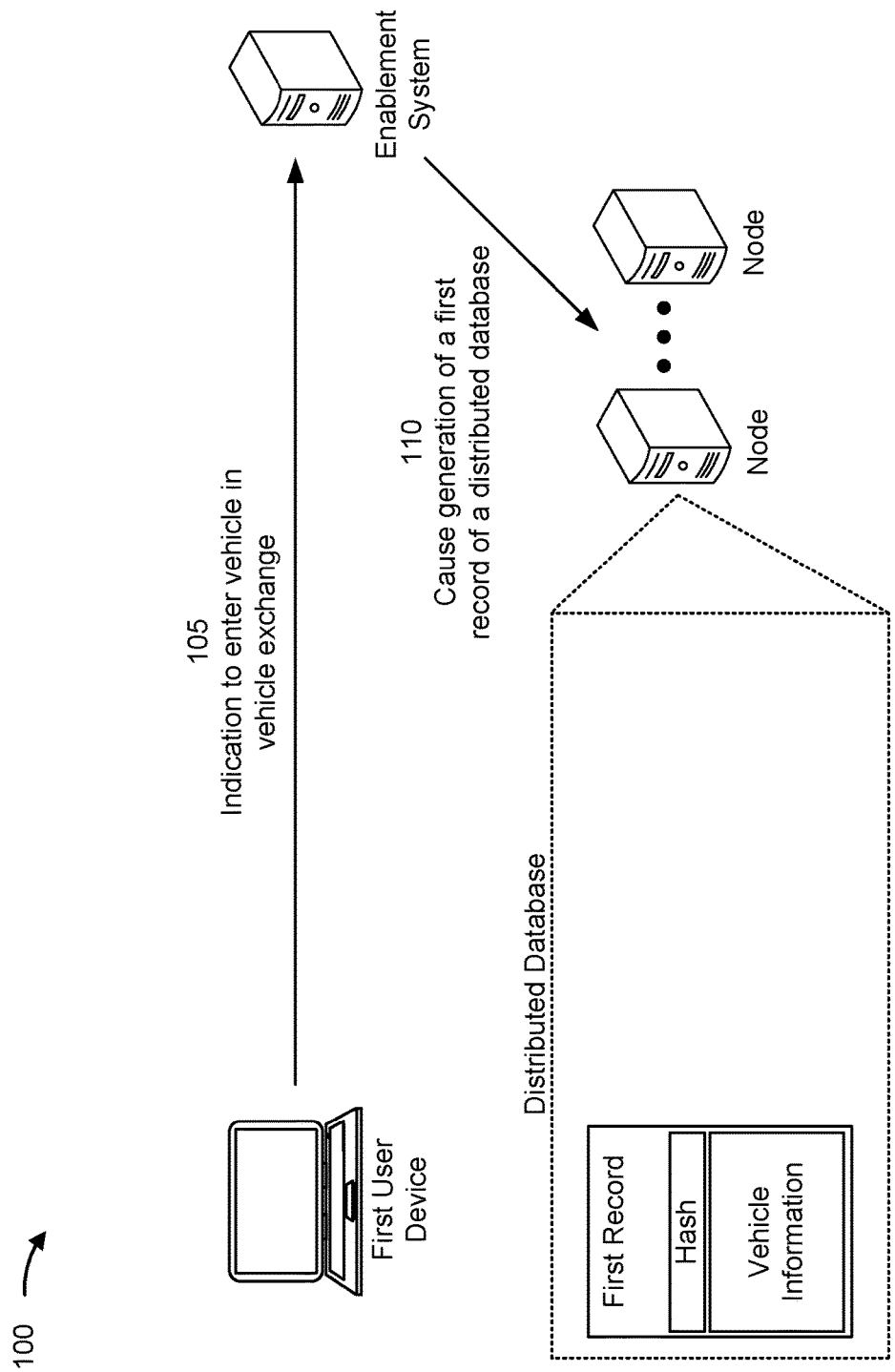
FIGS. 1A-1G are diagrams of an example associated with a distributed database with inter-related records relating to a vehicle, in accordance with some embodiments of the present disclosure.

The following detailed description of example implementations refers to the accompanying drawings. The same reference numbers in different drawings may identify the same or similar elements.

A database may be a source of, and a storage for, digital records that may be used in connection with a service or a system. For example, an intermediary party may operate a system that facilitates the exchange of items between users, and the system may employ a database to maintain digital records relating to items listed for exchange, to bids on the items, to transactions involving the items, or the like. Some implementations described herein provide a system that uses one or more distributed databases to implement a vehicle exchange. Each distributed database may be particular to a vehicle, and thus may include a plurality of inter-related records relating to the vehicle. Smart contracts indicating settings for bidding on the vehicle, settings for payment for the vehicle, settings for electing coverage for the vehicle, or the like, may be added to the distributed database. Execution of these smart contracts may automatically cause additional smart contracts to be added to the distributed database in furtherance of an exchange for the vehicle. A smart contract may provide a mechanism to facilitate a transaction between two parties without an intermediary or custodian. A smart contract may be coded as a set of rules that will result in a terminal state (e.g., the smart contract may include executable code designed to perform one or more actions based on the occurrence of a condition). A smart contract may be stored in a blockchain, and may be triggered based on various inputs, such as time.

Accordingly, the system may facilitate the exchange for the vehicle in an efficient manner that is secure, reliable, robust, and scalable. In particular, digital records can be unreliable and subject to tampering (e.g., hacking), where evidence of that tampering may not be easily detected. Some implementations described herein improve reliability of digital records by using a distributed database to store digital records in a manner that makes tampering of the digital records difficult and easy to detect. For example, some implementations described herein use cryptographic techniques to improve security associated with digital records (e.g., to prevent or reduce tampering or fraud). Furthermore, digital records can be easily deleted or subject to data loss. Some implementations described herein improve resiliency and robustness of digital records and may prevent data loss by storing the digital records in a distributed manner, rather than in one or more isolated databases. Furthermore, verifying the authenticity of digital records (e.g., transactions or other exchanges) may be difficult. Some implementations described herein enable digital records to be verified (e.g., using digital signatures and/or cryptographic signatures).

In some cases, retrieval of digital records from, or addition of digital records to, an isolated database may be associated with significant latency, particularly if requests to retrieve or add digital records to the database originate from computers located a significant distance from a system implementing the database. This may result in data involved in a request to the database becoming stale before the request is completed or shortly thereafter, which may necessitate multiple requests being made to the database. Some implementations described herein improve data retrieval and storage speed by maintaining digital records in a distributed manner in nodes that are widely distributed across a region (e.g., globally distributed). Moreover, an isolated database may be able to handle only a limited number of simultaneous, or near-simultaneous, requests before resources associated with the database become overwhelmed, resulting in failure of a system implementing database. Some implementations described herein use numerous distributed nodes (e.g., thousands or millions of nodes) to handle numerous simultaneous requests to retrieve or add digital records with improved performance and uptime.

FIGS. 1A-1G are diagrams of an example 100 associated with a distributed database with inter-related records relating to a vehicle. As shown in FIGS. 1A-1G, example 100 includes a first user device, a second user device, an enablement system, an account device, and a plurality of nodes of a distributed database system (e.g., a blockchain network). These devices are described in more detail in connection with FIGS. 4 and 5.

The distributed database system may include one or more distributed databases (e.g., blockchains) across the plurality of nodes. That is, each node may store a single copy of the distributed database(s). The distributed database(s) may be associated with a vehicle exchange that facilitates transactions for vehicles (e.g., the vehicle exchange may be configured for peer-to-peer exchange). In some implementations, the distributed database system may implement an exchange that facilitates transactions for one or more other types of items (e.g., real estate, collectibles, furniture, clothing, jewelry, or the like). The first user device may be associated with a first user (e.g., an individual or a business) that is to sell a vehicle via the vehicle exchange. The second user device may be associated with a second user (e.g., an individual or a business) that is to buy a vehicle via the vehicle exchange. The enablement system may perform operations associated with retrieving information from, or adding information to, the distributed database(s). For example, the enablement system may communicate with the one or more nodes to retrieve information from, or add information to, the distributed database(s). In some implementations, the enablement system may provide a user interface to receive an input from a user device indicating information that is to be retrieved from, or added to, the distributed database(s).

The enablement system may be associated with a participant (e.g., an authorized participant) of the distributed database system, such as a vehicle manufacturer, a vehicle dealership, a financial institution (e.g., that provides loan services in connection with vehicle purchases), a vehicle insurance provider, a vehicle servicer (e.g., a mechanic, a service center, or the like), or another participant that is authorized to add information to the distributed database(s). In some implementations, multiple participants may provide and/or use respective enablement systems to retrieve information from, or add information to, the distributed database(s). For example, a first enablement system may perform operations associated with selling vehicles in the vehicle exchange, a second enablement system may perform operations associated with buying vehicles in the vehicle exchange, a third enablement system may also perform operations associated with buying vehicles in the vehicle exchange, a fourth enablement system may perform operations associated with offering insurance coverage for vehicles purchased in the vehicle exchange, and so forth. Thus, the enablement system described herein may include a single enablement system that performs operations associated with retrieving information from, or adding information to, the distributed database(s), or may include multiple enablement systems (e.g., operating independently from each other) that perform operations associated with retrieving information from, or adding information to, the distributed database(s).

As shown in FIG. 1A, and by reference number 105, the enablement system (e.g., an enablement system associated with selling vehicles) may receive, from the first user device, an indication to enter a vehicle of the first user in the vehicle exchange. The indication may indicate information associated with the vehicle, such as a vehicle identification number (VIN) of the vehicle, a type of the vehicle (e.g., sedan, sport utility vehicle, motorcycle, or the like), a make of the vehicle, a model of the vehicle, a year of the vehicle, a trim of the vehicle, a color of the vehicle, a location of the vehicle, and/or an asking price for the vehicle, among other examples.

As shown by reference number 110, the enablement system may cause, based on the indication, generation of a first record (e.g., a genesis block) of a distributed database (e.g., a blockchain). For example, the enablement system may transmit, to a node of the distributed database system, a request to generate the first record, and the node may cause generation of the first record of the distributed database. The first record may indicate the information associated with the vehicle. Thus, the distributed database may be particular to the vehicle. That is, the distributed database may include a plurality of inter-related records that relate to the vehicle (e.g., only to the vehicle). Accordingly, a respective distributed database (e.g., a respective blockchain) may be associated with each vehicle that is entered in the vehicle exchange. In this way, data relating to a particular vehicle may be retrieved with improved speed and efficiency, relative to locating data for a particular vehicle in a distributed database that contains records for numerous vehicles. Each distributed database may be part of the distributed database system maintained by the plurality of nodes. In some implementations, another distributed database (e.g., another blockchain) of the distributed database system may include records indicating all of the vehicles, and their associated distributed databases, in the vehicle exchange.

In some implementations, after the first record of the distributed database is generated, one or more updates to the information associated with the vehicle may be made (e.g., to correct erroneous information, to update a location of the vehicle, or the like). For example, the enablement system may receive, from the first user device or a different user device, an indication indicating updated information associated with the vehicle. Based on the indication, the enablement system may cause (e.g., a node may cause) a smart contract, indicating the updated information, to be added to the distributed database. The smart contract may be directly or indirectly inter-related with the first record. For example, the smart contract may indicate information that directly or indirectly inter-relates the smart contract with the first record. In particular, as described in connection with FIG. 2, the smart contract may indicate a value (e.g., a hash value) associated with a chronologically preceding record in the distributed database. The preceding record may be the first record (e.g., directly inter-relating the smart contract and the first record). Alternatively, the preceding record may be a record that is chronologically between the smart contract and the first record, and that record may indicate a value associated with a chronologically preceding record and so forth (e.g., indirectly inter-relating the smart contract and the first record). By inter-relating records in this manner, tampering of the records may be difficult and easy to detect.

A smart contract is a program, stored in a distributed database (e.g., in a blockchain), that executes when particular conditions (e.g., predetermined conditions) are satisfied. A smart contract represents an execution of an agreement. Thus, any user of the distributed database (e.g., of the blockchain) can be aware of, and can predict, an outcome of a smart contract executing, which may occur without human interaction. For example, a smart contract may trigger a subsequent action in the distributed database (e.g., in the blockchain) when particular conditions are satisfied. A smart contract stored in a distributed database (e.g., in a blockchain) may be encrypted, and thus tampering (e.g., hacking) with the smart contract is difficult. Moreover, because each record in a distributed database (e.g., in a blockchain) may be inter-related to previous records and subsequent records (e.g., using previous hashes, as described herein), any alteration to a record in the distributed database requires alteration to the entire distributed database (e.g., to the entire blockchain).

In some implementations, the enablement system (e.g., an enablement system associated with a vehicle servicer, a governmental entity, and/or an insurance provider, among other examples) may receive, from one or more user devices (not shown), an indication indicating an event or a record associated with the vehicle (e.g., indicating a history of the vehicle). The event may be a servicing of the vehicle (e.g., an oil change, a tire rotation, a filter replacement, or the like), a repair of the vehicle, a software update to the vehicle, an accident involving the vehicle, and/or a traffic infraction involving the vehicle, among other examples. The record may indicate a title of the vehicle (e.g., to prevent a duplicate title or lost title), a title insurance for the vehicle, and/or a lien on the vehicle, among other examples. Based on the indication, the enablement system may cause (e.g., a node may cause) a smart contract, indicating information relating to the event or the record, to be added to the distributed database. The smart contract may be directly or indirectly inter-related with the first record, as described herein. Thus, the distributed database may include a plurality of smart contracts indicating events or records associated with the vehicle.

Figure 1B:
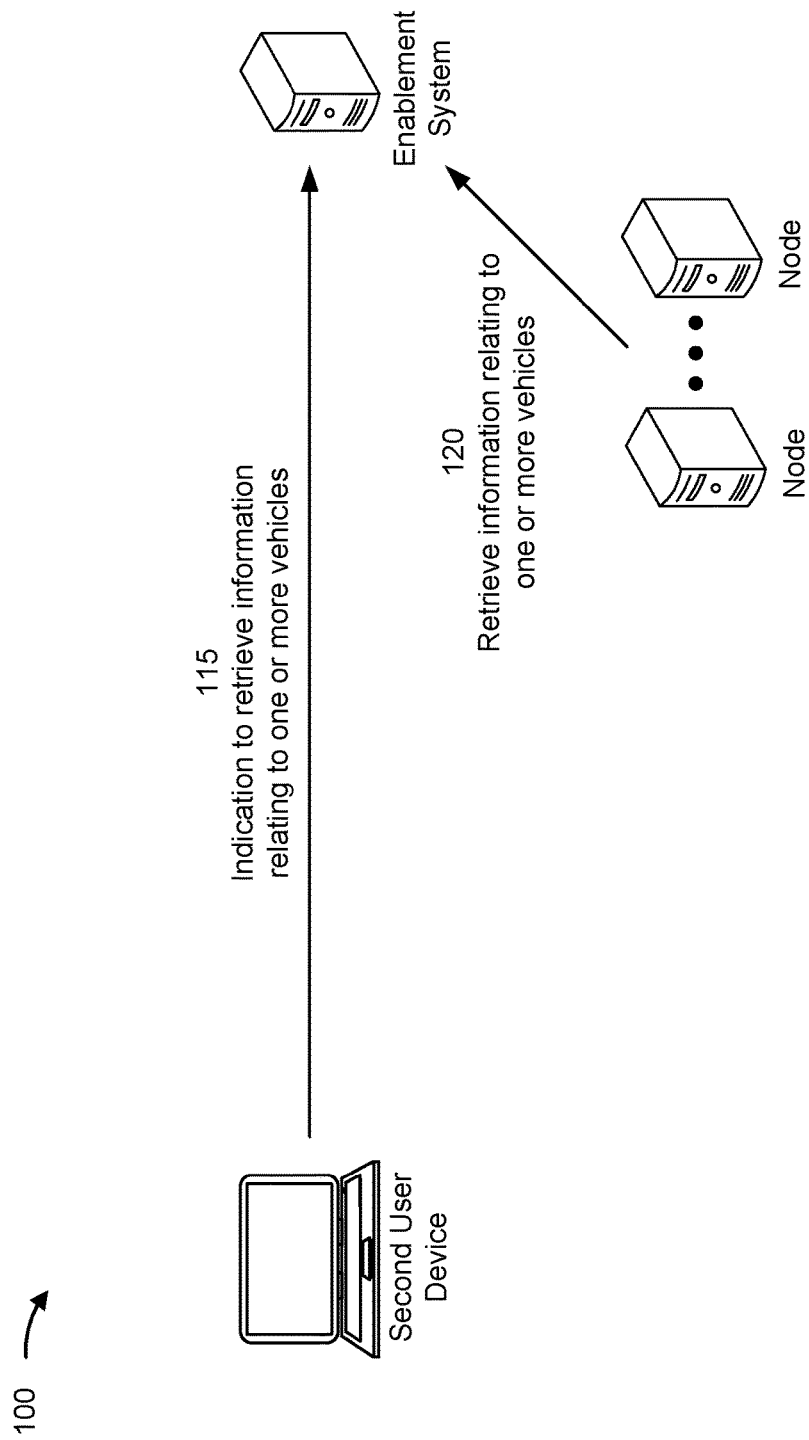

As shown in FIG. 1B, and by reference number 115, the enablement system (e.g., an enablement system associated with buying vehicles, such as an enablement system associated with a financial institution) may receive, from the second user device, an indication to retrieve information relating to one or more vehicles in the vehicle exchange. For example, the second user device may provide the indication via a user interface provided by the enablement system. In some implementations, the indication may indicate one or more particular vehicles (e.g., by VINs) and/or the indication may indicate one or more criteria (e.g., a particular vehicle type, make, model, year, or the like).

As shown by reference number 120, the enablement system may retrieve information relating to one or more vehicles in the vehicle exchange. For example, the enablement system may retrieve the information based on the indication. As described herein, information relating to a vehicle may be in a distributed database particular to the vehicle, such as in a first record of the distributed database and/or in one or more smart contracts of the distributed database. Thus, the enablement system may retrieve information relating to a first vehicle from a first distributed database particular to the first vehicle, retrieve information relating to a second vehicle from a second distributed database particular to the second vehicle, and so forth.

In some implementations, the enablement system may transmit the information to the second user device (e.g., for presentation in a user interface on the second user device). In some implementations, in connection with each vehicle, the user interface may include one or more input elements (e.g., hyperlinks) that are configured to cause detailed vehicle information, vehicle history information, and/or vehicle title information (e.g., so that authenticity and ownership of the vehicle can easily be confirmed), among other examples, to be displayed in the user interface. In some implementations, based on the user of the second user device viewing information relating to a vehicle, the enablement system may cause (e.g., a node may cause) a smart contract, indicating the viewing of the information, to be added to a distributed database associated with the vehicle. The smart contract may be directly or indirectly inter-related with a first record of the distributed database, as described herein.

Figure 1C:
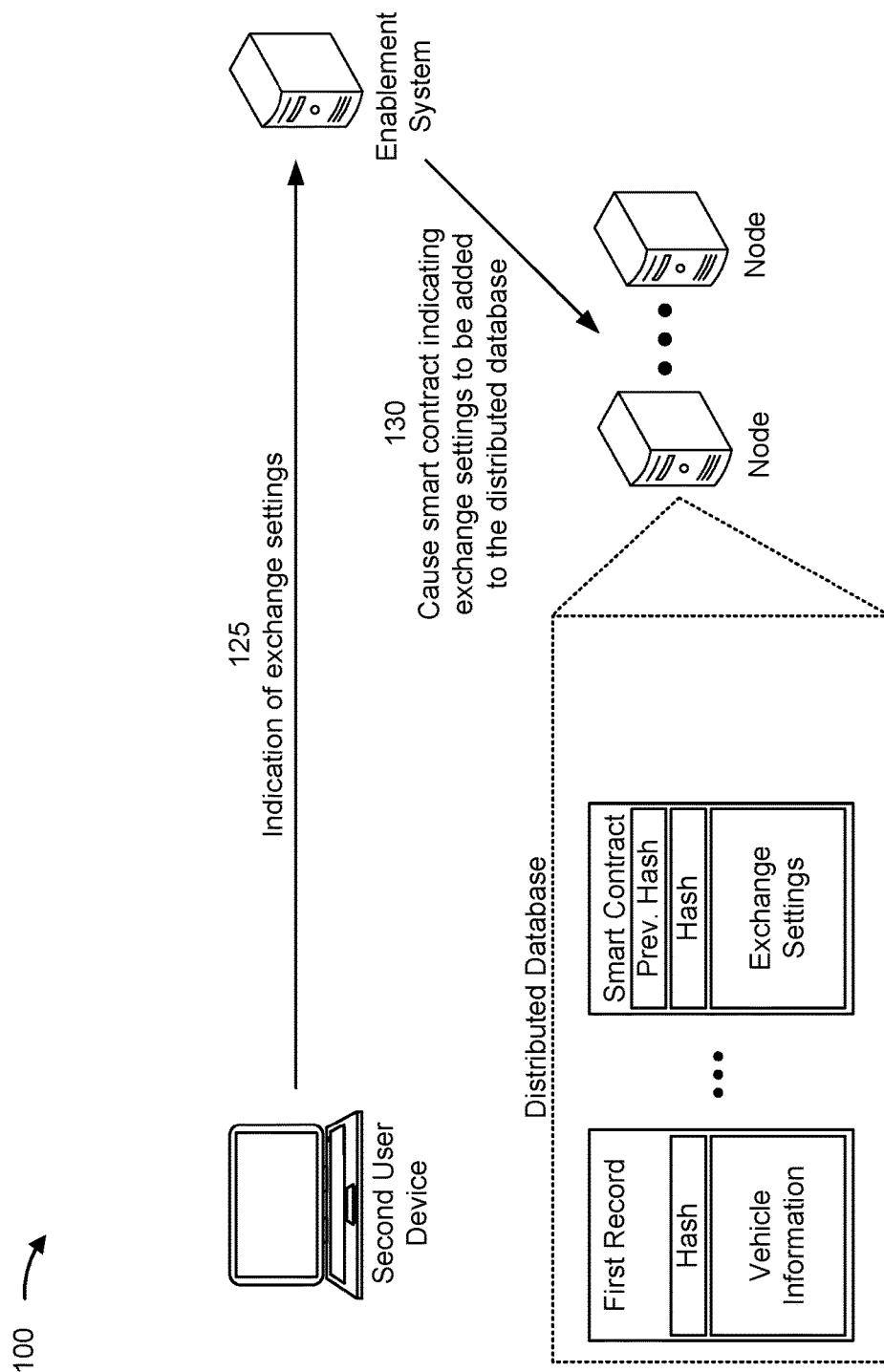

As shown in FIG. 1C, and by reference number 125, the enablement system may receive, from the second user device, an indication of one or more exchange settings for a vehicle (e.g., one of the vehicles for which information was retrieved). The exchange settings may indicate an exchange amount (e.g., a price) that the user of the second user device is willing to pay for the vehicle, a maximum exchange amount that the user is willing to pay for the vehicle, an increment amount for increasing an exchange amount that is entered (e.g., bid or offered) for the vehicle, a quantity of other users that have accessed information for the vehicle that is to trigger entering an exchange amount for the vehicle, a quantity of other exchange amounts entered for the vehicle (e.g., of other bids or offers for the vehicle by other users) that is to trigger entering an exchange amount for the vehicle, and/or an amount of another exchange amount entered for the vehicle (e.g., of another bid or offer for the vehicle by another user) that is to trigger entering an exchange amount for the vehicle, among other examples.

As shown by reference number 130, the enablement system may cause, based on the indication, a smart contract, indicating the one or more exchange settings, to be added to the distributed database associated with the vehicle. For example, the enablement system may transmit, to one or more nodes of the distributed database system, a request to add the smart contract, and the node may cause the smart contract to be added to the distributed database. The smart contract may include code that indicates the one or more exchange settings. The smart contract may be directly or indirectly inter-related with the first record of the distributed database, as described herein. Execution of the smart contract (e.g., in accordance with the one or more exchange settings) may automatically cause an additional smart contract, indicating an exchange amount for the vehicle based on the one or more exchange settings, to be added to the distributed database. That is, satisfaction of an exchange setting may trigger the exchange amount to be entered for the vehicle (e.g., via the additional smart contract). The additional smart contract may be directly or indirectly inter-related with the smart contract, as described herein.

Figure 1D:
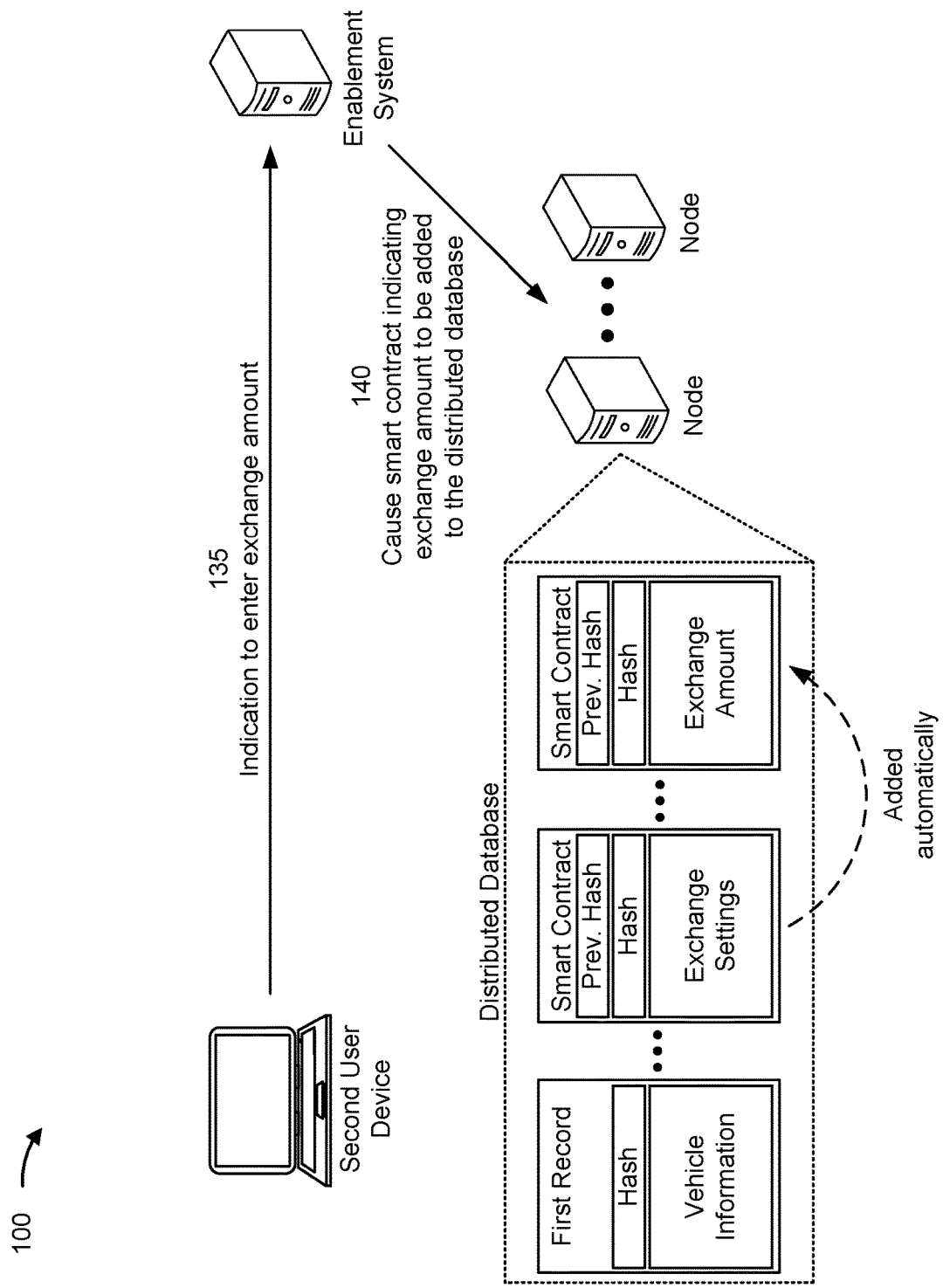

As shown in FIG. 1D, and by reference number 135, the enablement system may receive, from the second user device, an indication to enter an exchange amount (e.g., a bid or offer) for the vehicle. For example, the second user device may provide the indication in the absence of exchange settings that automatically enter an exchange amount for the vehicle. As shown by reference number 140, based on the indication, the enablement system may cause a smart contract, indicating the exchange amount, to be added to the distributed database associated with the vehicle. For example, the enablement system may transmit, to one or more nodes of the distributed database system, a request to add the smart contract, and the node may cause the smart contract to be added to the distributed database. The smart contract may be directly or indirectly inter-related with the first record, as described herein.

In some implementations, the enablement system may receive, from the second user device, an indication of escrow information for the second user. The escrow information may indicate a source of funds for satisfying an exchange of the vehicle from the first user to the second user. For example, the source of funds may be cryptocurrency assets of the second user, a financial account of the second user, or the like. Based on the indication, the enablement system may cause (e.g., a node may cause) a smart contract, indicating the escrow information, to be added to the distributed database associated with the vehicle, in a similar manner as described herein. The smart contract may include code that indicates the escrow information. The smart contract may be directly or indirectly inter-related with the first record of the distributed database, as described herein.

Execution of the smart contract, upon an exchange of the vehicle from the first user to the second user, may automatically cause an additional smart contract, indicating payment to the first user in accordance with the escrow information, to be added to the distributed database. Additionally, or alternatively, execution of the smart contract, upon an exchange of the vehicle from the first user to the second user, may automatically cause a record, indicating a cryptocurrency transaction in accordance with the escrow information, to be added to another distributed database (e.g., a blockchain for a cryptocurrency). Additionally, or alternatively, execution of the smart contract, upon an exchange of the vehicle from the first user to the second user, may automatically cause a transfer (e.g., of funds) to an account of the second user.

In some implementations, the enablement system may receive, from the second user device, an indication of one or more vehicle coverage (e.g., vehicle insurance) settings. The vehicle coverage settings may indicate a maximum amount that the second user is willing to pay for vehicle coverage, a minimum amount that the second user is willing to pay for vehicle coverage, one or more types of coverage that are to be included in vehicle coverage, one or more minimum coverage limits of vehicle coverage, and/or one or more maximum coverage limits of vehicle coverage. Based on the indication, the enablement system may cause (e.g., a node may cause) a smart contract, indicating the one or more vehicle coverage settings, to be added to the distributed database associated with the vehicle, in a similar manner as described herein. The smart contract may be directly or indirectly inter-related with the first record of the distributed database, as described herein.

Figure 1E:
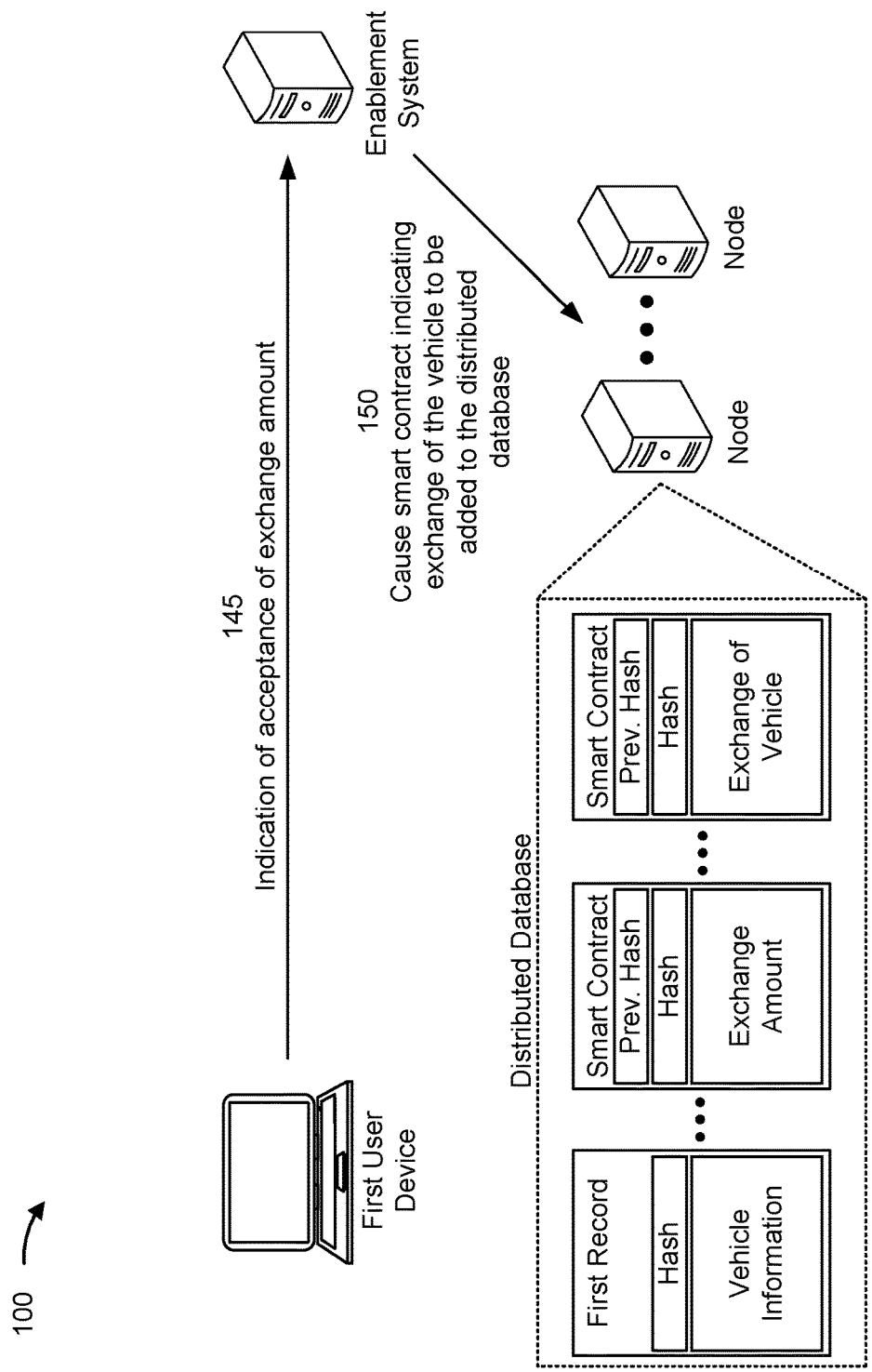

As shown in FIG. 1E, and by reference number 145, the enablement system (e.g., an enablement system associated with selling vehicles) may receive, from the first user device, an indication of acceptance of the exchange amount. Additionally, or alternatively, acceptance of the exchange amount may be indicated by exchange settings associated with the first user, which may be indicated in a smart contract added to the distributed database, in a similar manner as the exchange settings associated with the second user. The exchange settings of the first user may indicate a minimum exchange amount that the first user is willing to accept for the vehicle, a type of payment that the first user is willing to accept, or the like.

As shown by reference number 150, based on the indication of acceptance, the enablement system may cause a smart contract, indicating an exchange of the vehicle between the first user and the second user, to be added to the distributed database associated with the vehicle. For example, the enablement system may transmit, to one or more nodes of the distributed database system, a request to add the smart contract, and the node may cause the smart contract to be added to the distributed database. The smart contract may be directly or indirectly inter-related with the smart contract indicating the exchange amount, as described herein. In some implementations, execution of the smart contract indicating the exchange settings of the first user may automatically cause the smart contract, indicating the exchange of the vehicle, to be added to the distributed database. In some implementations, the smart contract indicating the exchange of the vehicle may cause execution of the smart contract indicating the escrow information.

Figure 1F:
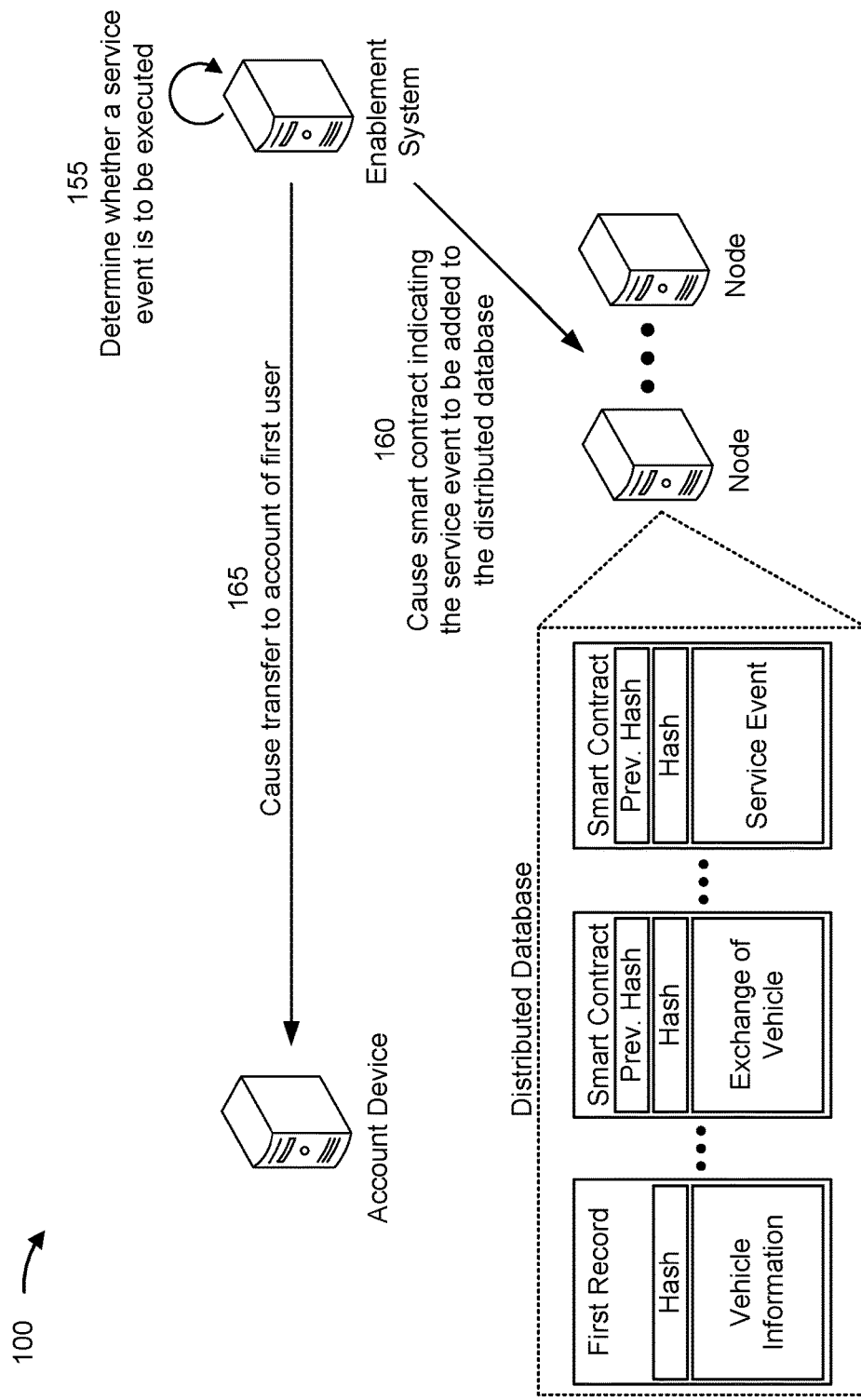

As shown in FIG. 1F, and by reference number 155, the enablement system (e.g., an enablement system associated with a financial institution) may determine whether a service event, for the exchange of the vehicle, is to be executed. The enablement system may determine whether the service event is to be executed based on the exchange for the vehicle (e.g., based on identifying the smart contract indicating the exchange for the vehicle). The service event may be funding a loan for the exchange amount or a portion thereof. For example, the enablement system may determine that the service event (e.g., funding of the loan) is to be executed based on information (e.g., in the distributed database) associated with the vehicle (e.g., a maintenance history of the vehicle, an accident history of the vehicle, title information for the vehicle, or the like) and/or information associated with the second user (e.g., a credit score of the second user, a loan payment history of the second user, an amount of debt associated with the second user, or the like).

As shown by reference number 160, the enablement system may cause (e.g., based on determining that the service event is to be executed) a smart contract, indicating the service event for the exchange for the vehicle, to be added to the distributed database associated with the vehicle. For example, the enablement system may transmit, to one or more nodes of the distributed database system, a request to add the smart contract, and the node may cause the smart contract to be added to the distributed database. The smart contract may be directly or indirectly inter-related with the smart contract indicating the exchange amount or the smart contract indicating the exchange, as described herein. As shown by reference number 165, the enablement system may cause a transfer (e.g., of funds) to an account (e.g., a financial account) of the first user (e.g., by transmitting information indicating the transfer to the account device, which may be associated with a financial institution that maintains the account). For example, based on the service event (e.g., funding a loan for the exchange for the vehicle), the enablement system may cause the transfer to the account of the first user. After the exchange of the vehicle from the first user to the second user, one or more smart contracts indicating an event or a record associated with the vehicle may be added to the distributed database associated with the vehicle, in a similar manner as described above.

Figure 1G:
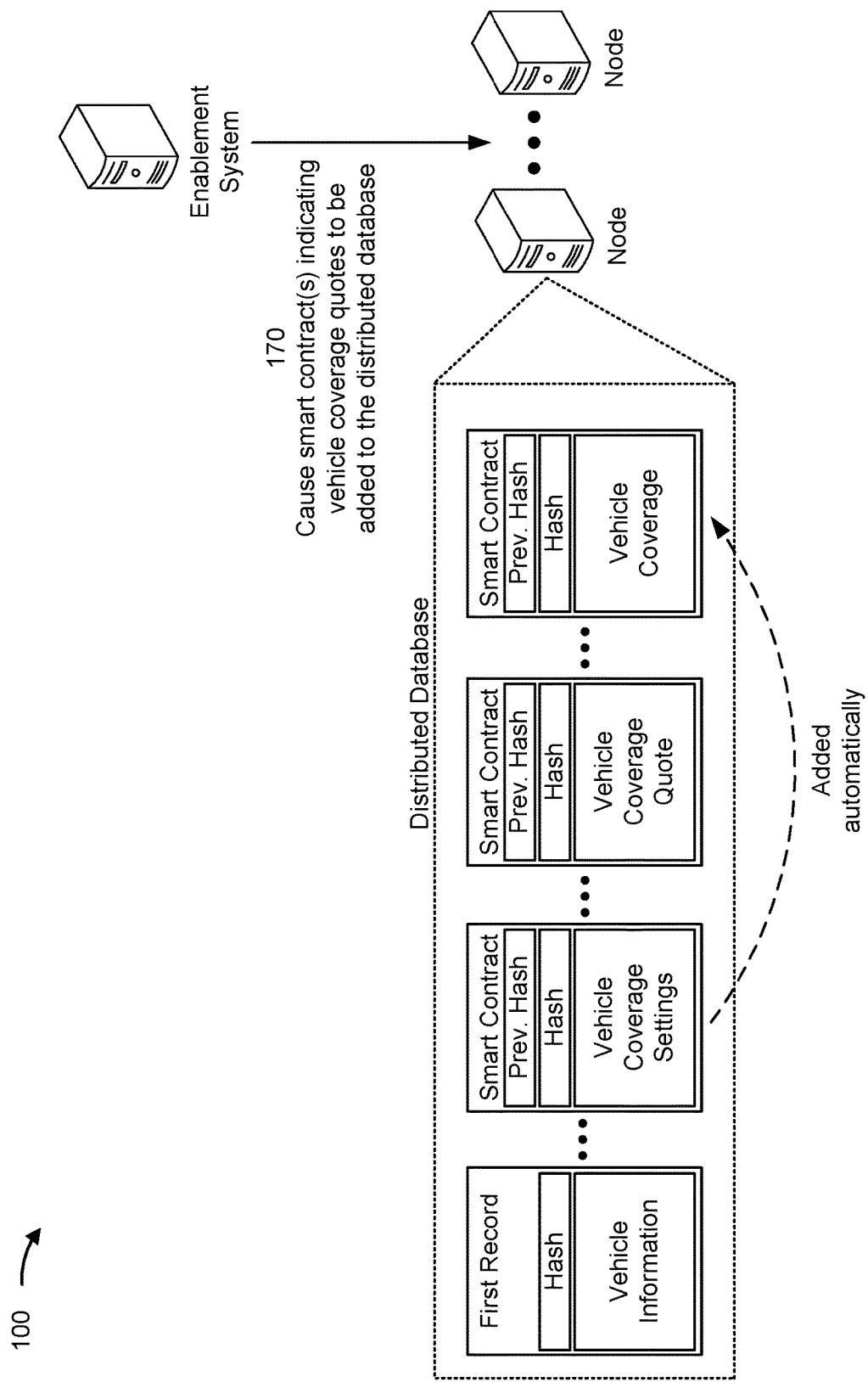

As shown in FIG. 1G, and by reference number 170, the enablement system (e.g., an enablement system associated with selling vehicles and/or an insurance provider) may cause, after acceptance of the exchange amount (e.g., after the exchange for the vehicle), one or more smart contracts, respectively indicating one or more vehicle coverage quotes for the vehicle, to be added to the distributed database associated with the vehicle. For example, the enablement system may transmit, to one or more nodes of the distributed database system, a request to add the one or more smart contracts, and the node may cause the one or more smart contracts to be added to the distributed database. The vehicle coverage quotes may be provided to the enablement system by insurance providers and/or may be determined by the enablement system based on information associated with the vehicle. In some implementations, the enablement system may determine a vehicle coverage quote based on information associated with a different vehicle and information relating to a vehicle coverage of the different vehicle (e.g., which may be indicated in a different distributed database for the different vehicle). A vehicle coverage quote may indicate a coverage amount (e.g., a price) for coverage (e.g., insurance coverage) for the vehicle and/or one or more coverage types of the coverage. In some implementations, the enablement system may cause the one or more smart contracts to be added to the distributed database based on an occurrence of an event, such as an exchange of the vehicle or an expiration of a previous vehicle coverage for the vehicle.

In some implementations, execution of the smart contract indicating the one or more vehicle coverage settings is to automatically cause an additional smart contract, indicating a vehicle coverage for the vehicle based on the one or more vehicle coverage settings and/or the one or more vehicle insurance quotes, to be added to the distributed database associated with the vehicle. That is, satisfaction of one or more of the vehicle coverage settings by a vehicle coverage quote may trigger an election (e.g., via the additional smart contract) of the vehicle coverage associated with the vehicle coverage quote for the vehicle. The additional smart contract may be directly or indirectly inter-related with the smart contract indicating the vehicle coverage settings and/or the smart contract indicating the vehicle coverage quote, as described herein. Moreover, the additional smart contract indicating the vehicle coverage may cause execution of the smart contract indicating the escrow information, to cause a transfer of a payment for the vehicle coverage that is elected.

In some implementations, the enablement system may receive, from the second user device, an indication of an election of vehicle coverage for the vehicle. For example, the second user device may provide the indication in the absence of vehicle coverage settings that automatically elect vehicle coverage for the vehicle. Accordingly, the enablement system may cause the smart contract, indicating the vehicle coverage for the vehicle, to be added to the distributed database associated with the vehicle. In some implementations, a smart contract may be added to the distributed database, as described herein, indicating a reminder to renew the vehicle coverage. For example, execution of the smart contract indicating the vehicle coverage may automatically cause the smart contract indicating the reminder to be added to the distributed database.

In this way, the distributed database may improve the reliability of digital records therein by storing the digital records in a manner that makes tampering of the digital records difficult and easy to detect. Moreover, the distributed database may improve resiliency and robustness of digital records therein and may prevent data loss by storing the digital records in a distributed manner, rather than in one or more isolated databases. Furthermore, the distributed database may improve data retrieval and storage speed by maintaining digital records in nodes that are widely distributed (e.g., globally distributed), thereby improving a speed of interactions with the vehicle exchange. In addition, the distributed database may be able to handle numerous simultaneous requests to retrieve or add digital records, thereby improving a performance and a resiliency of the vehicle exchange.

As indicated above, FIGS. 1A-1G are provided as an example. Other examples may differ from what is described with regard to FIGS. 1A-1G.

Figure 2:
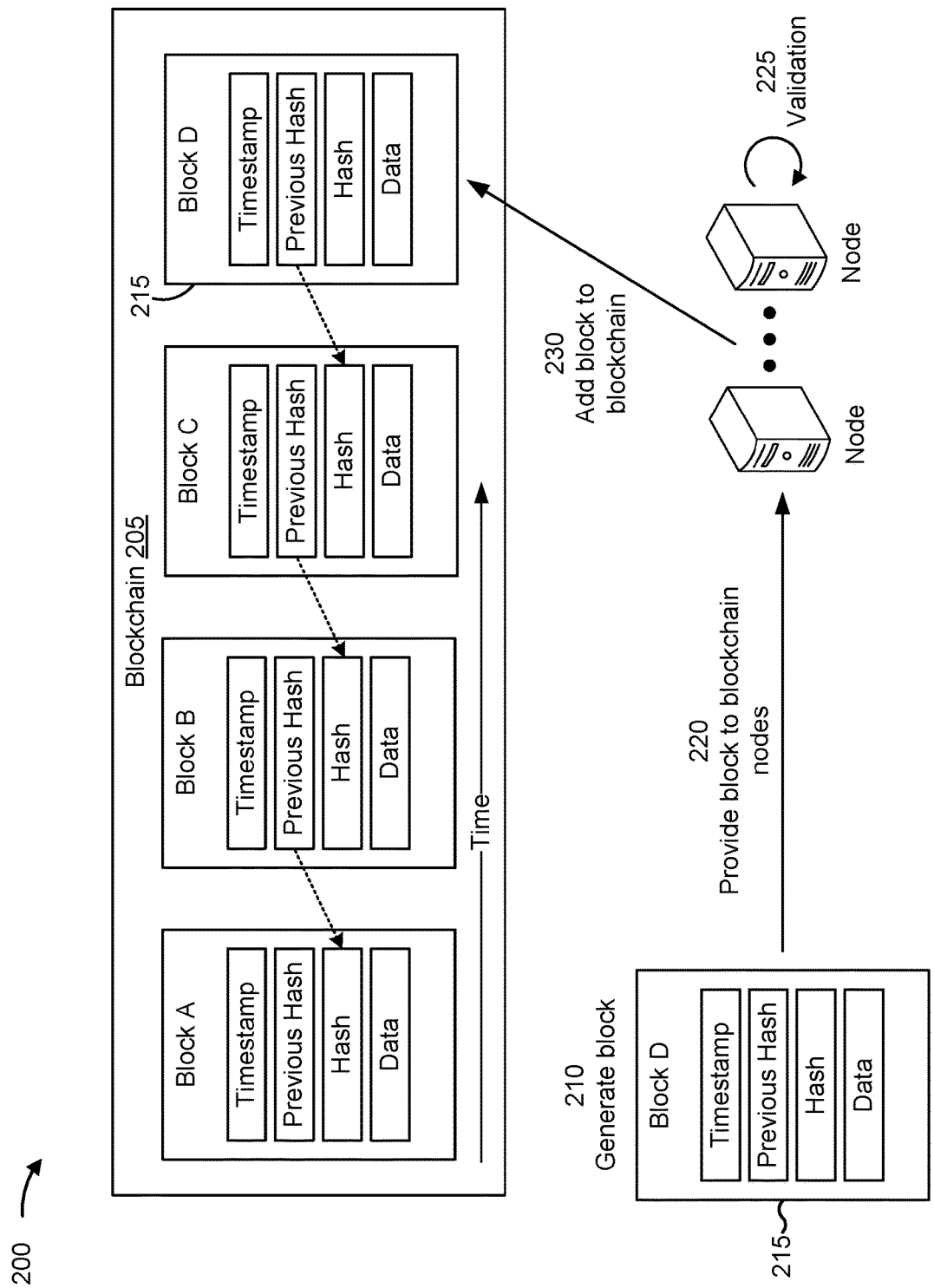
FIG. 2 is a diagram illustrating an example of a blockchain and use thereof, in accordance with some embodiments of the present disclosure.

FIG. 2 is a diagram illustrating an example 200 of a blockchain and use thereof. As shown in FIG. 2, some operations of example 200 may be performed by multiple blockchain nodes. The blockchain nodes may form a blockchain network, and a blockchain 205 may be distributed among the blockchain nodes of the blockchain network. Blockchain 205 may be a distributed ledger, or distributed database, that maintains a list of records, called blocks, that may be linked together to form a chain. In some implementations, the blockchain 205 may be a distributed database described herein. In some implementations, a block of the blockchain 205 may be a record or a smart contract, as described herein, of a distributed database.

As shown by reference number 210, a procedure for adding to blockchain 205 may begin with generating a block 215. Block 215 may be generated in response to receiving a request (e.g., from the enablement system, described herein) to add information (which may be called a transaction) to blockchain 205. In some implementations, block 215 may be generated by a blockchain node.

As shown, each block of blockchain 205, including generated block 215, indicates a timestamp, a previous hash, a hash, and data, among other examples. For block 215, the data may include the information that was requested to be added. For example, the information may include information associated with a vehicle, information indicating an event or a record associated with a vehicle, information indicating one or more exchange settings, escrow information, information indicating one or more vehicle coverage settings, information indicating an exchange amount, information indicating an exchange, information indicating vehicle coverage, or the like, as described herein. The timestamp, the previous hash, and the hash may define a header of a block. The hash of a block may be a hash representation (e.g., using one or more hashing methods) of the block's data, and the previous hash may be the hash value in the previous block's header. For example, the previous hash in the header of Block B may be the hash value in the header of Block A, and so forth. Thus, the blocks may be chained together by each block referencing the hash value of the previous block. In this way, an altered block may be easily detected and rejected from blockchain 205.

As shown by reference number 220, generated block 215 may be provided (e.g., broadcast) to all blockchain nodes in the blockchain network. As shown by reference number 225, before block 215 is added to blockchain 205, other blockchain nodes should agree that block 215 is valid. That is, the blockchain nodes may reach a consensus on the validity of block 215. To validate block 215, the blockchain nodes may utilize one or more consensus techniques, which may utilize a proof of work (PoW) algorithm, a proof of stake (PoS) algorithm, a delegated proof of stake (DPoS) algorithm, and/or a practical Byzantine fault tolerance (PBFT) algorithm, among other examples. As shown by reference number 230, once validated, the blockchain nodes may add block 215 to their respective copies of blockchain 205.

Thus, a blockchain is a shared, immutable ledger that facilitates the process of recording transactions and tracking assets (e.g., vehicles) in a network setting with equal visibility to all participants of the network. For example, all network participants have access to the distributed ledger and its immutable record of transactions. With this shared ledger, transactions are recorded only once, thereby eliminating the duplication of effort, which may be typical of conventional networks. Moreover, no participant can change or tamper with a transaction after the transaction has been recorded to the shared ledger. Thus, if a transaction record includes an error, a new transaction must be added to reverse the error, and both transactions are then visible.

As indicated above, FIG. 2 is provided as an example. Other examples may differ from what is described in connection with FIG. 2.

Figure 3:
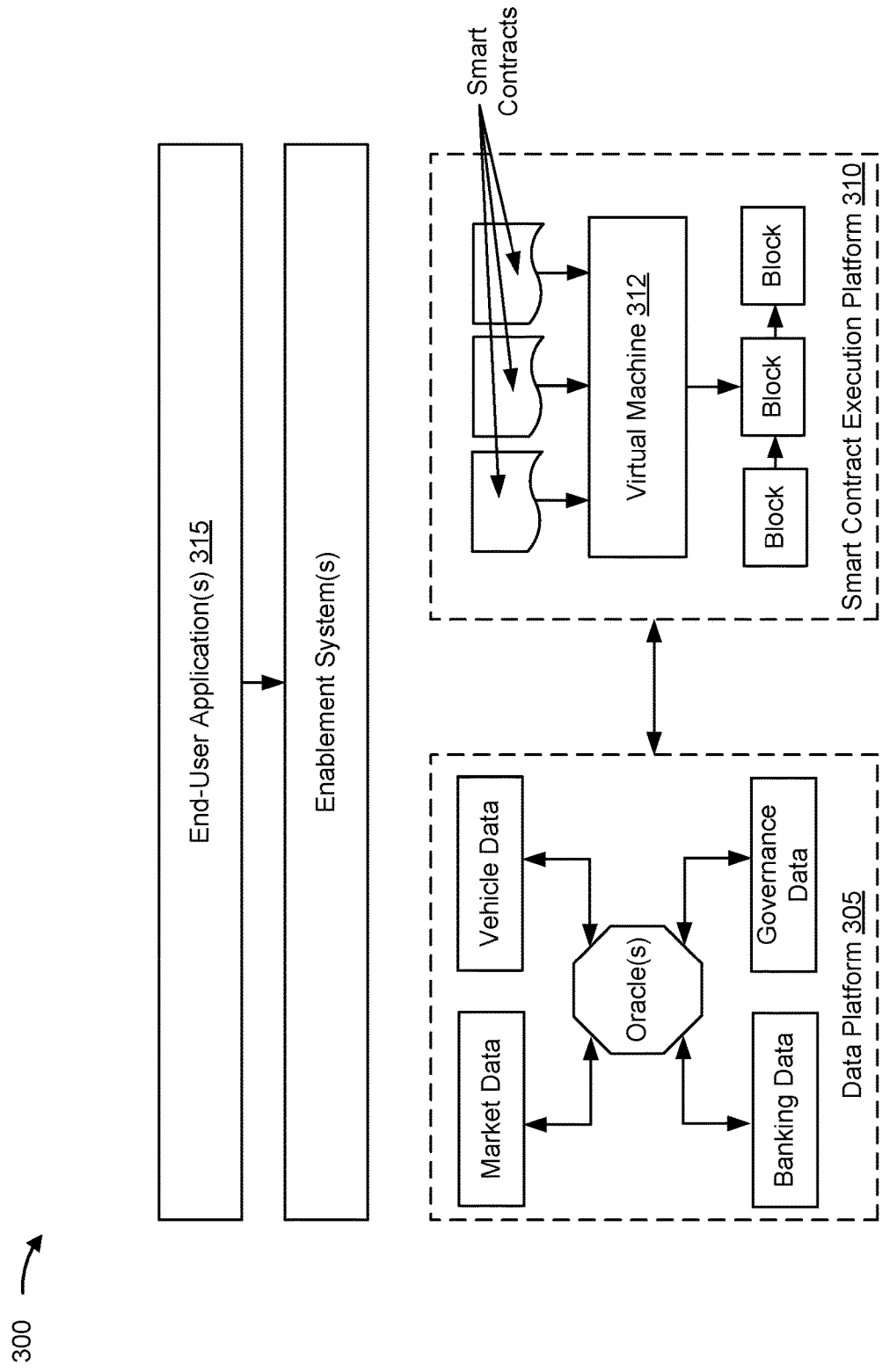
FIG. 3 is a diagram illustrating an example of smart contract execution, in accordance with some embodiments of the present disclosure.

FIG. 3 is a diagram illustrating an example 300 of smart contract execution. As shown in FIG. 3, example 300 includes an enablement system, a data platform 305, and a smart contract execution platform 310. As shown, one or more enablement systems may receive inputs via one or more user interfaces associated with one or more end-user applications 315 (e.g., that may be executed on a user device). The inputs may indicate information that is to be added to a distributed database (e.g., blockchain 205) and/or information that is to be retrieved from the distributed database.

The enablement system may communicate (e.g., based on the inputs) with the data platform 305 and the smart contract execution platform 310. The data platform 305 (e.g., an oracle) may provide off-chain data (e.g., data from a source other than a blockchain) into a blockchain for use by smart contracts of the blockchain. For example, as shown, the data platform 305 may provide market data, vehicle data, banking data, and/or governance data, among other examples. The smart contract execution platform 310 may include a virtual machine 312 configured to execute smart contracts and to compute a state of a blockchain network. Data may be written into a memory of the virtual machine 312 as a block of the blockchain.

As indicated above, FIG. 3 is provided as an example. Other examples may differ from what is described in connection with FIG. 3.

Figure 4:
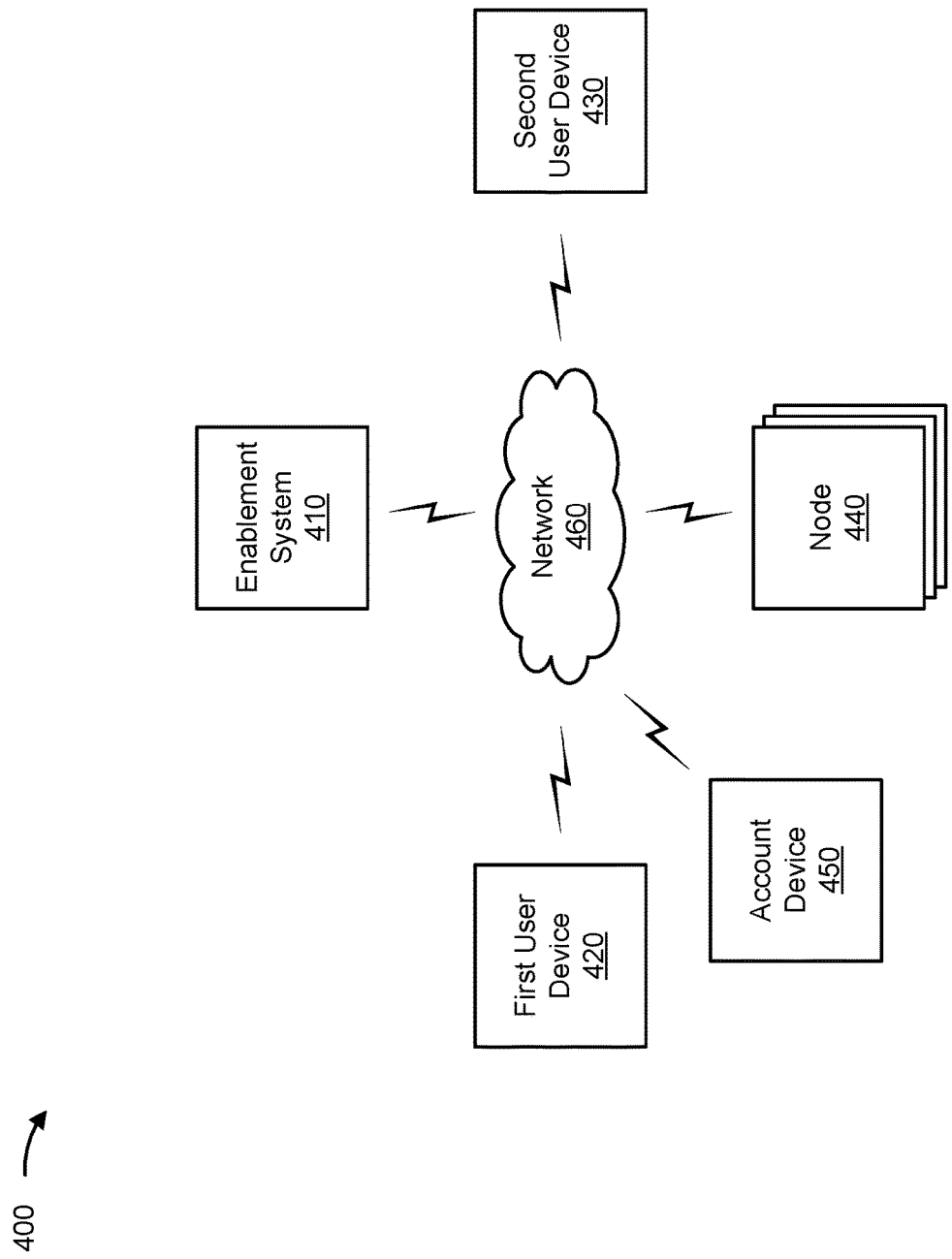
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include an enablement system 410, a first user device 420, a second user device 430, multiple nodes 440 (e.g., of a distributed database system), an account device 450, and a network 460. Devices of environment 400 may interconnect via wired connections, wireless connections, or a combination of wired and wireless connections.

The enablement system 410 may include one or more devices capable of receiving, generating, storing, processing, providing, and/or routing information associated with a vehicle exchange implemented by a distributed database system (e.g., associated with inter-relating records in a distributed database), as described elsewhere herein. The enablement system 410 may include a communication device and/or a computing device. For example, the enablement system 410 may include a server, such as an application server, a client server, a web server, a database server, a host server, a proxy server, a virtual server (e.g., executing on computing hardware), or a server in a cloud computing system. In some implementations, the enablement system 410 may include computing hardware used in a cloud computing environment.

The first user device 420 may include one or more devices capable of receiving, generating, storing, processing, and/or providing information associated with a vehicle exchange implemented by a distributed database system, as described elsewhere herein. The first user device 420 may include a communication device and/or a computing device. For example, the first user device 420 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The second user device 430 may include one or more devices capable of receiving, generating, storing, processing, and/or providing information associated with a vehicle exchange implemented by a distributed database system, as described elsewhere herein. The second user device 430 may include a communication device and/or a computing device. For example, the second user device 430 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

A node 440 may include one or more devices capable of receiving, generating, storing, processing, providing, and/or routing information associated with a vehicle exchange implemented by a distributed database system (e.g., associated with inter-relating records in a distributed database), as described elsewhere herein. The node 440 may include a communication device and/or a computing device. For example, the node 440 may include a server, such as an application server, a client server, a web server, a database server, a host server, a proxy server, a virtual server (e.g., executing on computing hardware), or a server in a cloud computing system. In some implementations, the node 440 may include computing hardware used in a cloud computing environment.

The account device 450 may include one or more devices capable of receiving, generating, storing, processing, providing, and/or routing information associated with a transfer of assets, as described elsewhere herein. The account device 450 may include a communication device and/or a computing device. For example, the account device 450 may include a server, such as an application server, a client server, a web server, a database server, a host server, a proxy server, a virtual server (e.g., executing on computing hardware), or a server in a cloud computing system. In some implementations, the account device 450 may include computing hardware used in a cloud computing environment.

The network 460 may include one or more wired and/or wireless networks. For example, the network 460 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 460 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
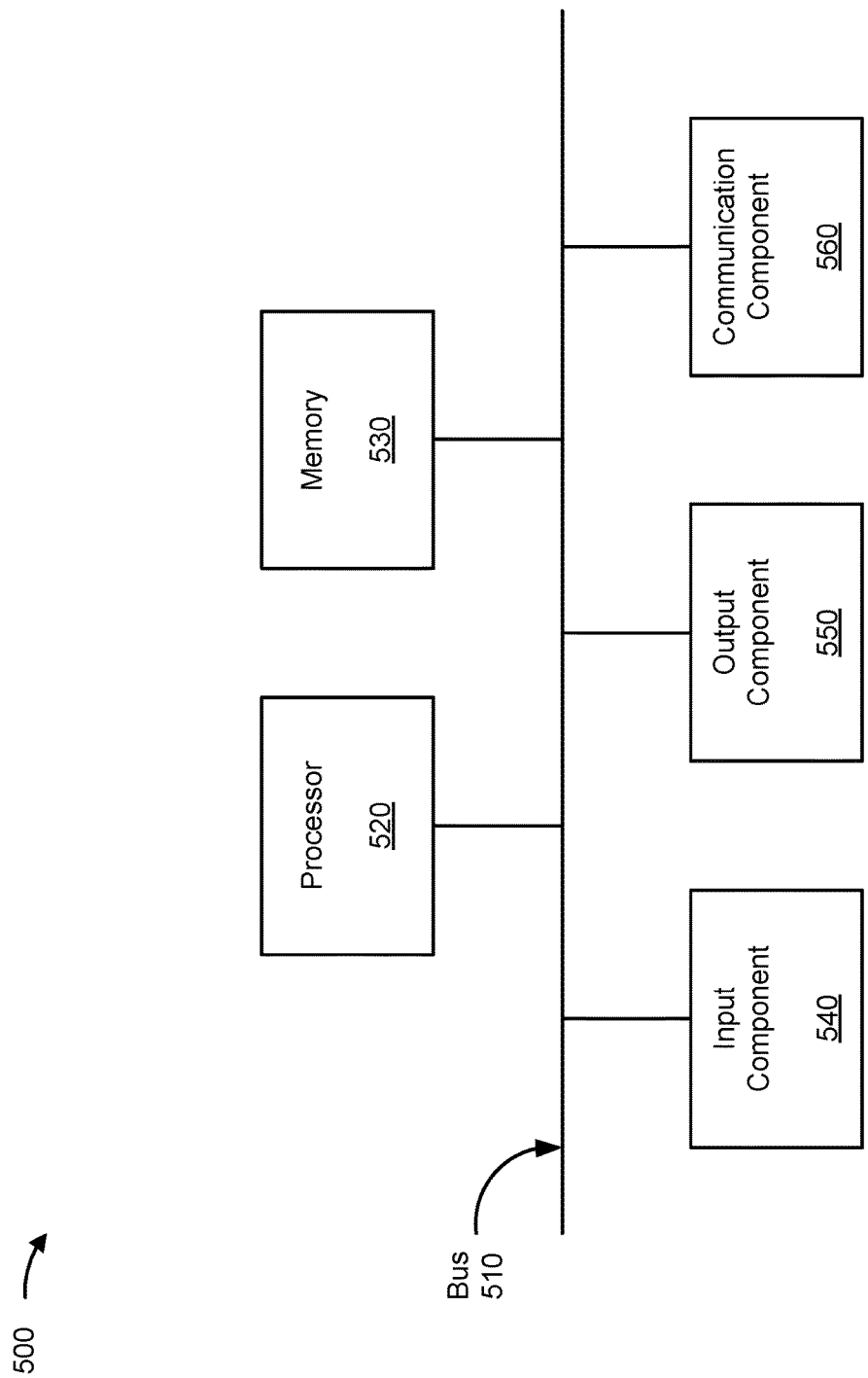
FIG. 5 is a diagram of example components of a device associated with a vehicle exchange implemented by a distributed database system, in accordance with some embodiments of the present disclosure.

FIG. 5 is a diagram of example components of a device 500 associated with a vehicle exchange implemented by a distributed database system. The device 500 may correspond to the enablement system 410, the first user device 420, the second user device 430, the node 440, and/or the account device 450. In some implementations, the enablement system 410, the first user device 420, the second user device 430, the node 440, and/or the account device 450 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
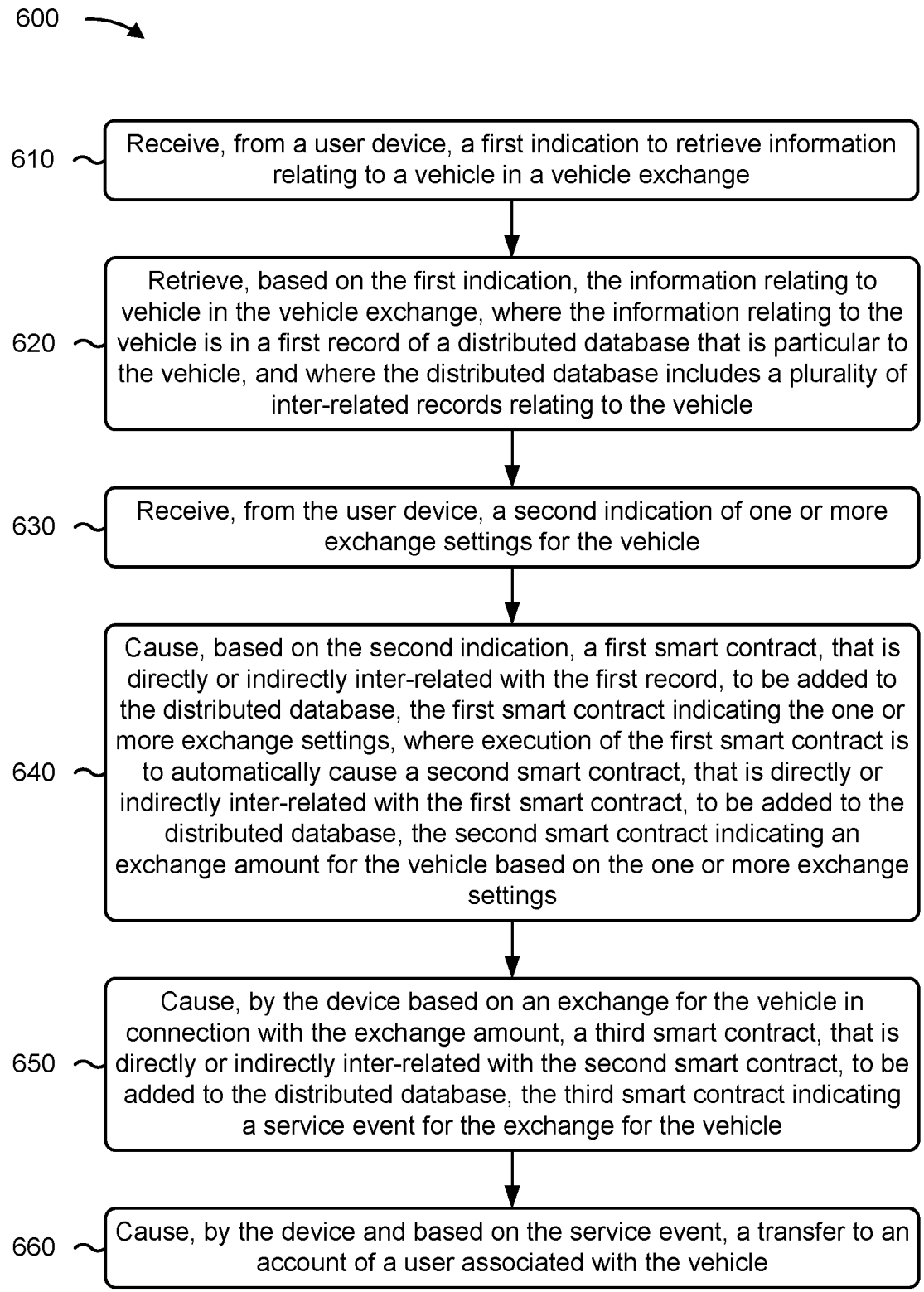
FIG. 6 is a flowchart of an example process associated with a distributed database with inter-related records relating to a vehicle, in accordance with some embodiments of the present disclosure.

FIG. 6 is a flowchart of an example process 600 associated with a distributed database with inter-related records relating to a vehicle (e.g., associated with inter-relating records in the distributed database). In some implementations, one or more process blocks of FIG. 6 may be performed by the enablement system 410. In some implementations, one or more process blocks of FIG. 6 may be performed by another device or a group of devices separate from or including the enablement system 410, such as the first user device 420, the second user device 430, one or more nodes 440, and/or the account device 450. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving a first indication to retrieve information relating to a vehicle in a vehicle exchange (block 610). For example, the enablement system 410 (e.g., using processor 520, memory 530, input component 540, and/or communication component 560) may receive a first indication to retrieve information relating to a vehicle in a vehicle exchange, as described above in connection with reference number 115 of FIG. 1B. As an example, a user device may provide the indication via a user interface provided by the enablement system, and the indication may indicate one or more particular vehicles and/or the indication may indicate one or more criteria for vehicles that are to be displayed in the user interface.

As further shown in FIG. 6, process 600 may include retrieving the information relating to the vehicle in the vehicle exchange, where the information relating to the vehicle is in a first record of a distributed database that is particular to the vehicle, and where the distributed database includes a plurality of inter-related records relating to the vehicle (block 620). For example, the enablement system 410 (e.g., using processor 520, memory 530, input component 540, and/or communication component 560) may retrieve the information relating to the vehicle in the vehicle exchange, as described above in connection with reference number 120 of FIG. 1B. As an example, the information relating to the vehicle may be in a distributed database particular to the vehicle, such as in a first record of the distributed database and/or in one or more smart contracts of the distributed database.

As further shown in FIG. 6, process 600 may include receiving a second indication of one or more exchange settings for the vehicle (block 630). For example, the enablement system 410 (e.g., using processor 520, memory 530, input component 540, and/or communication component 560) may receive a second indication of one or more exchange settings for the vehicle, as described above in connection with reference number 125 of FIG. 1C. As an example, the exchange settings may indicate one or more conditions, events, or the like, that are to automatically cause an exchange amount (e.g., a bid) to be entered for the vehicle.

As further shown in FIG. 6, process 600 may include causing a first smart contract, that is directly or indirectly inter-related with the first record, to be added to the distributed database, the first smart contract indicating the one or more exchange settings, where execution of the first smart contract is to automatically cause a second smart contract, that is directly or indirectly inter-related with the first smart contract, to be added to the distributed database, the second smart contract indicating an exchange amount for the vehicle based on the one or more exchange settings (block 640). For example, the enablement system 410 (e.g., using processor 520, memory 530, output component 550, and/or communication component 560) may cause a first smart contract, that is directly or indirectly inter-related with the first record, to be added to the distributed database, as described above in connection with reference number 130 of FIG. 1C. As an example, execution of the first smart contract may automatically cause a second smart contract, indicating an exchange amount (e.g., a bid) for the vehicle based on the one or more exchange settings, to be added to the distributed database.

As further shown in FIG. 6, process 600 may include causing a third smart contract, that is directly or indirectly inter-related with the second smart contract, to be added to the distributed database, the third smart contract indicating a service event for the exchange for the vehicle (block 650). For example, the enablement system 410 (e.g., using processor 520, memory 530, output component 550, and/or communication component 560) may cause a third smart contract, that is directly or indirectly inter-related with the second smart contract, to be added to the distributed database, the third smart contract indicating a service event for the exchange for the vehicle, as described above in connection with reference number 160 of FIG. 1F. As an example, based on a service event (e.g., funding of a loan) that is to be executed, the third smart contract may be added to the distributed database.

As further shown in FIG. 6, process 600 may include causing, based on the service event, a transfer to an account of a user associated with the vehicle (block 660). For example, the enablement system 410 (e.g., using processor 520 and/or memory 530) may cause, based on the service event, a transfer to an account of a user associated with the vehicle, as described above in connection with reference number 165 of FIG. 1F. As an example, based on the service event (e.g., funding a loan for the exchange for the vehicle), the transfer to the account of the first user may be performed.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1G. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of inter-relating records in a distributed database, comprising:
   receiving, by a device, a first indication to retrieve information relating to a vehicle in a vehicle exchange;
   retrieving, by the device, based on the first indication, and from a first record of a distributed database, the information relating to the vehicle,
      wherein the distributed database is particular to the vehicle and includes a plurality of records relating to the vehicle;
   receiving, by the device, a second indication of one or more exchange settings for the vehicle, wherein the one or more exchange settings are associated with an exchange amount for the vehicle;
   transmitting, by the device, based on the second indication of the one or more exchange settings for the vehicle, and to one or more nodes associated with the distributed database, a request to add a first smart contract, that includes a hash value associated with the first record, to the distributed database, the first smart contract indicating the one or more exchange settings,
      wherein execution of the first smart contract is to automatically cause a second smart contract, that includes a hash value associated with the first smart contract, to be added to the distributed database, the second smart contract indicating the exchange amount for the vehicle based on the one or more exchange settings;
   transmitting, by the device, based on an exchange for the vehicle in connection with the exchange amount, and to one or more nodes associated with the distributed database, a request to add a third smart contract, that includes a hash value associated with the second smart contract, to the distributed database, the third smart contract indicating a funding event for a loan for the exchange for the vehicle; and
   causing, by the device and based on the funding event for the loan, a transfer to an account of a user associated with the vehicle.

2. The method of claim 1, wherein the one or more exchange settings indicate at least one of:
   a maximum exchange amount for the vehicle,
   an increment amount for increasing an exchange amount that is entered for the vehicle,
   a time for entering an exchange amount for the vehicle,
   a quantity of users that have accessed the information for the vehicle that is to trigger entering an exchange amount for the vehicle,
   a quantity of other exchange amounts entered for the vehicle that is to trigger entering an exchange amount for the vehicle, or
   an amount of another exchange amount entered for the vehicle that is to trigger entering an exchange amount for the vehicle.

3. The method of claim 1, wherein the vehicle exchange is configured for peer-to-peer exchange.

4. The method of claim 1, further comprising:
   determining, based on the exchange for the vehicle, whether a funding event for the loan is to be executed for the vehicle,
      wherein the third smart contract is caused to be added to the distributed database based on determining that the funding event for the loan is to be executed for the vehicle.

5. The method of claim 1, wherein the distributed database includes a smart contract indicating information relating to a title of the vehicle.

6. The method of claim 1, wherein the distributed database includes one or more smart contracts indicating information relating to an event associated with the vehicle.

7. The method of claim 1, wherein the distributed database includes a smart contract indicating one or more vehicle coverage settings.

8. The method of claim 7, wherein execution of the smart contract is to automatically cause an additional smart contract to be added to the distributed database, the additional smart contract indicating a vehicle coverage for the vehicle.

9. A system for inter-relating records in a distributed database, the system comprising:
one or more memories; and
one or more processors, communicatively coupled to the one or more memories, configured to:
cause, based on a first indication to enter a vehicle, of a first user, in a vehicle exchange, generation of a first record of a distributed database, the first record indicating information associated with the vehicle,
wherein the distributed database is particular to the vehicle, and
wherein the distributed database is to include a plurality of records relating to the vehicle;
transmit, based on a second indication indicating one or more exchange settings of a second user, and to one or more nodes associated with the distributed database, a request to add a first smart contract, that includes a hash value associated with the first record, to the distributed database, the first smart contract indicating the one or more exchange settings,
wherein execution of the first smart contract is to cause a second smart contract, that includes a hash value associated with the first smart contract, to be automatically added to the distributed database, the second smart contract indicating an exchange amount for the vehicle based on the one or more exchange settings; and
transmit, based on a third indication indicating acceptance of the exchange amount for the vehicle, and to one or more nodes associated with the distributed database, a request to add a third smart contract, that includes a hash value associated with the second smart contract, to the distributed database, the third smart contract indicating an exchange of the vehicle between the first user and the second user.

10. The system of claim 9, wherein the one or more processors are further configured to:
cause, based on a fourth indication indicating one or more vehicle coverage settings for the second user, a smart contract to be added to the distributed database, the smart contract indicating the one or more vehicle coverage settings.

11. The system of claim 10, wherein the one or more processors are further configured to:
cause, after the third indication, one or more smart contracts to be added to the distributed database, the one or more smart contracts respectively indicating one or more vehicle coverage quotes for the vehicle.

12. The system of claim 11, wherein execution of the smart contract is to automatically cause an additional smart contract to be added to the distributed database, the additional smart contract indicating a vehicle coverage for the vehicle based on the one or more vehicle coverage settings and the one or more vehicle coverage quotes.

13. The system of claim 9, wherein a smart contract of the distributed database indicates escrow information for the second user.

14. A non-transitory computer-readable medium storing a set of instructions for inter-relating records in a distributed database, the set of instructions comprising:
one or more instructions that, when executed by one or more processors of a device, cause the device to:
retrieve information relating to a vehicle in a vehicle exchange,
wherein the information relating to the vehicle is in a distributed database that is particular to the vehicle, and
wherein the distributed database includes a plurality of records relating to the vehicle;
receive, from a user device, an indication of an exchange amount for the vehicle; and
transmit, based on the indication and to one or more nodes associated with the distributed database, a request to add a smart contract to the distributed database, the smart contract indicating the exchange amount.

15. The non-transitory computer-readable medium of claim 14, wherein the one or more instructions, when executed by the one or more processors, further cause the device to:
cause, based on an exchange for the vehicle in connection with the exchange amount, an additional smart contract, that includes a hash value associated with the smart contract, to be added to the distributed database, the additional smart contract indicating a funding event for a loan for the exchange for the vehicle.

16. The non-transitory computer-readable medium of claim 15, wherein the one or more instructions, when executed by the one or more processors, further cause the device to:
cause, based on the funding event for the loan, a transfer to an account of a user associated with the vehicle.

17. The non-transitory computer-readable medium of claim 14, wherein an additional smart contract of the distributed database includes escrow information, and
wherein execution of the additional smart contract, upon an exchange for the vehicle, is to automatically cause a transfer to an account of a user associated with the vehicle.

18. The non-transitory computer-readable medium of claim 14, wherein the distributed database includes an additional smart contract indicating information relating to an event or a record associated with the vehicle.

19. The non-transitory computer-readable medium of claim 14, wherein the distributed database includes an additional smart contract indicating one or more vehicle coverage settings, and
wherein execution of the additional smart contract is to automatically cause another smart contract to be added to the distributed database, the other smart contract indicating a vehicle coverage for the vehicle.

20. The non-transitory computer-readable medium of claim 14, wherein the smart contract is inter-related with a first record of the distributed database.

* * * * *